United States Patent

Suzuki et al.

[11] Patent Number: 6,140,423
[45] Date of Patent: Oct. 31, 2000

[54] CHLORINATED VINYL CHLORIDE RESIN COMPOSITION

[75] Inventors: Takeyuki Suzuki; Toshio Okuhara, both of Hyogo; Minoru Isshiki, Shiga, all of Japan

[73] Assignee: Kaneka Corporation, Osaka, Japan

[21] Appl. No.: 09/218,140

[22] Filed: Dec. 22, 1998

[30] Foreign Application Priority Data

Dec. 25, 1997 [JP] Japan ................................. 9-356871

[51] Int. Cl.$^7$ ............................. C08L 27/06; B29D 24/00
[52] U.S. Cl. ...................... 525/213; 525/239; 264/209.1; 524/527
[58] Field of Search ..................... 525/213, 238; 264/209.1

[56] References Cited

U.S. PATENT DOCUMENTS

| | | | |
|---|---|---|---|
| 5,194,471 | 3/1993 | Hartitz | 524/180 |
| 5,591,497 | 1/1997 | Hartitz | 428/36.92 |
| 5,604,278 | 2/1997 | Hartitz | 524/399 |
| 5,981,663 | 11/1999 | Backman et al. | 525/235 |

FOREIGN PATENT DOCUMENTS

| | | |
|---|---|---|
| 0 510 310 | 10/1992 | European Pat. Off. . |
| 2 008 674 | 1/1970 | France . |
| 48-32942 | 9/1973 | Japan . |
| 1 234 135 | 6/1971 | United Kingdom . |
| 1 235 403 | 6/1971 | United Kingdom . |

OTHER PUBLICATIONS

Database WPI; Derwent Publications Ltd.; Class A14; AN 96–272832; XP002098296; JP 08 113685; (Sekisui Chem Ind Co Ltd.); May 7, 1996.

*Primary Examiner*—Tae Yoon
*Attorney, Agent, or Firm*—Foley & Lardner

[57] ABSTRACT

A chlorinated vinyl chloride resin composition, which is suitably used for the production of extruded pipes, containing a chlorinated vinyl chloride resin which has a polymerization degree of from 600 to 1500 prior to chlorination and a chlorination degree of from 62 to 70 wt. %, methyl methacrylate-butadiene-styrene copolymer particles having a butadiene content of less than 60 wt. % and a styrene content of larger than 30 wt. % in the whole particles, and a chlorinated polyethylene having a chlorine content of from 10 to 50 wt. %, in which the methyl methacrylate-butadiene-styrene copolymer particles have an average dispersed particle size of 2,000 angstroms or less in an extruded pipe produced from the composition.

6 Claims, No Drawings

CHLORINATED VINYL CHLORIDE RESIN COMPOSITION

BACKGROUND OF THE INVENTION

1. Field of the Invention

The present invention relates to a chlorinated vinyl chloride resin composition. In particular, the present invention relates to a chlorinated vinyl chloride resin composition suitable for the production of extruded pipes.

2. Prior Art

Shaped articles of chlorinated vinyl chloride resin compositions have characteristics such as high heat resistance and are used at relatively high temperatures at which conventional vinyl chloride resin compositions cannot be used due to thermal deformation. For example, the shaped articles of chlorinated vinyl chloride resin compositions are used in the form of a pipe for hot water by making use of the high thermal deformation temperature which is 20 to 40° C. higher than that of the shaped articles of vinyl chloride resin compositions.

Furthermore, when pipes are produced, chlorinated vinyl chloride resins can be shaped with a conventional extruder for vinyl chloride resins. The use of such an extrusion method is one reason for that the chlorinated vinyl chloride resin can be widely used.

However, chlorinated vinyl chloride resins have a drawback that they have inferior thermal stability to vinyl chloride resins, and thus they tend to be burnt in a shaping process. For example, a chlorinated vinyl chloride resin is colored when it is extrusion molded to produce a pipe for hot water, or in some cases, it is burnt during extrusion molding. Thus, such a produced pipe may not be commercially sold.

In addition, when a chlorinated vinyl chloride resin is extruded in the form of a pipe for hot water, the die pressure and extrusion torque of an extruder increase, and the resin is burnt. To prevent burning, with a conventional extruder for vinyl chloride resins, the discharge amount of chlorinated vinyl chloride resins should be decreased in comparison with vinyl chloride resins to reduce the die pressure and extrusion torque. That is, when extruded pipes are produced from chlorinated vinyl chloride resins, the discharge amount of the resins is low, and thus the productivity of the pipes decreases.

SUMMARY OF THE INVENTION

One object of the present invention is to provide a chlorinated vinyl chloride resin composition suitable for the production of extruded pipes, which has good thermal stability, and can increase the discharge amount of the composition during extrusion and thus improve the productivity.

Accordingly, the present invention provides a chlorinated vinyl chloride resin composition for use in the production of an extruded pipe comprising 100 wt. parts of a chlorinated vinyl chloride resin which has a polymerization degree of from 600 to 1500 prior to chlorination and a chlorination degree of from 62 to 70 wt. %, 3 to 15 wt. parts of MBS (methyl methacrylate-butadiene-styrene copolymer) particles having a butadiene content of less than 60 wt. % and a styrene content of larger than 30 wt. % in the whole particles, and 1 to 5 wt. parts of a chlorinated polyethylene having a chlorine content of from 10 to 50 wt. %, wherein said MBS particles have an average dispersed particle size of 2,000 angstroms (Å) or less in an extruded pipe produced from said composition.

DETAILED DESCRIPTION OF THE INVENTION

A vinyl chloride resin (prior to post-chlorination) has a polymerization degree of from 600 to 1500, preferably from 600 to 1300. The chlorination degree of the chlorinated vinyl chloride resin is from 62 to 70 wt. %, preferably from 65 to 70 wt. %.

When the polymerization degree of a vinyl chloride resin as the raw material of a chlorinated vinyl chloride resin is less than 600, sufficient mechanical strength cannot be attained. When this polymerization degree exceeds 1500, the processing of the resin composition is not easy.

When the chlorination degree of a chlorinated vinyl chloride resin is less than 62 wt. %, a resin composition does not have sufficient heat resistance. When the chlorination degree exceeds 70 wt. %, the resin has a high melt viscosity, and thus the processing of a resin composition undesirably encounters technical problems.

Herein, "vinyl chloride resins" include vinyl chloride homopolymers, and also copolymers of vinyl chloride with 20 wt. % or less of at least one other copolymerizable monomer (e.g. ethylene, propylene, vinyl acetate, allyl chloride, allyl glycidyl ether, acrylate esters, vinyl ethers, etc.).

The MBS particles used in the present invention has a butadiene content of less than 60 wt. % and a styrene content of larger than 30 wt. %, in the whole particles.

When the butadiene content in the MBS particles is 60 wt. % or more, a die pressure and an extrusion torque increase during the extrusion of the composition to produce pipes. Therefore, a feeding amount should be suppressed to decrease a discharge amount, and thus the productivity of the pipes deteriorates.

The styrene content in the MBS particles should be larger than 30 wt. % to improve the flowability of the chlorinated vinyl chloride resin and thus increase the discharge amount of the composition.

The amount of MBS particles is from 3 to 15 wt. parts per 100 wt. parts of the chlorinated vinyl chloride resin.

When the amount of MBS particles is less than 3 wt. parts, the impact resistance of the pipes deteriorates. When the amount of MBS particles exceeds 15 wt. parts, the heat resistance inherent in the chlorinated vinyl chloride resins tends to decrease. The amount of MBS particles is preferably from 4 to 12 wt. parts from the viewpoint of the balance between the impact resistance and heat resistance of the produced pipes.

The MBS particles in the extruded pipes have an average dispersed particle size of 2,000 Å or less, preferably 1,800 Å or less to improve the impact resistance of the pipes. The lower limit of the average dispersed particle size of the MBS particles is not limited, but is usually 1,000 Å.

The average dispersed particle size of the MBS particles can be measured by a conventional method. For example, a composition mass is cut in the form of a sample piece of about 5 mm square, and dyed by an osmic acid dyeing method (dipping the sample piece in a 1 wt. % aqueous solution of osmic acid). Then, the sample piece is very thinly sliced and observed with a transmission electron microscope. The MBS particles are seen as black circles, and their diameters are measured and averaged.

It is preferable to use MBS having a Vicat softening point of at least 60° C. under a load of 1 kg to increase a discharge amount by increasing a feed amount while suppressing a die pressure and an extrusion torque during the extrusion process of pipes. The Vicat softening point of MBS usually does not exceed 90° C.

According to the present invention, the chlorinated vinyl chloride resin composition contains 1 to 5 wt. parts of a chlorinated polyethylene having a chlorine content of from 10 to 50 wt. %, per 100 wt. parts of the chlorinated vinyl chloride resin, to increase a discharge amount through the decrease of a die pressure and an extrusion torque during the extrusion process of pipes.

When the chlorine content of the chlorinated polyethylene is outside the above range, the compatibility of the chlorinated polyethylene with the chlorinated vinyl chloride resin as a base resin deteriorates, and thus the extruded pipes tend to have insufficient impact strength. The chlorinated polyethylene preferably has a chlorine content of from 30 to 40 wt. % to improve the impact strength of the extruded pipes.

When the amount of the chlorinated polyethylene is less than 1 wt. parts, it is difficult to achieve the effect to increase a discharge amount through the suppression of a die pressure and an extrusion torque. When the amount of the chlorinated polyethylene exceeds 5 wt. parts, the heat resistance inherent in the chlorinated vinyl chloride resin deteriorates.

The chlorinated vinyl chloride resin composition of the present invention may preferably contain stabilizers and/or lubricants, in addition to the MBS particles and the chlorinated polyethylene.

Stabilizers may be any conventional stabilizers for chlorinated vinyl chloride resins such as tin-base stabilizers, lead-base stabilizers, etc. Among them, tin-base stabilizers are preferable.

Preferable examples of tin-base stabilizers are alkyltin compounds (e.g. methyltin, butyltin, octyltin, mixed metal alkyltin, dialkyltin dicarboxylate salts, etc.). Other examples of tin-base stabilizers are mercaptomethyltin, mercaptooctyltin, mercaptobutyltin, dialkyltinbis (alkylmercaptocarboxylate salt), di-n-octyltin-S,S'-bis (isooctylmercaptoacetate), butyltin maleate polymer, butyltin maleate ester, octyltin maleate polymer, octyltin maleate ester, etc.

The amount of a stabilizer is preferably from 1.5 to 5 wt. parts per 100 wt. parts of a chlorinated vinyl chloride resin. When the amount of a stabilizer is less than 1.5 wt. parts, the thermal stability of a chlorinated vinyl chloride resin composition may not be improved. When the amount of a stabilizer exceeds 5 wt. parts, the effect to improve the thermal stability reaches the limit, and thus the thermal stability will not be improved in a degree comparable to the added amount of the stabilizer.

Lubricants may also be any conventional ones.

Examples of lubricants are polyglycerol of di- or trioleate, polyethylene, oxidized polyethylene, high molecular weight paraffin waxes, etc. Among them, polyethylene waxes are preferable.

The amount of a lubricant is preferably from 1.5 to 4 wt. parts per 100 wt. parts of a chlorinated vinyl chloride resin. When the amount of a lubricant is less than 1.5 wt. parts, the composition has a high melt viscosity, and thus its extrusion precessability deteriorates. When the amount of a lubricant exceeds 4 wt. parts, the lubricity of the resin against metals becomes too high, and thus the composition may pulsate when it is discharged in the extrusion processing process.

The chlorinated vinyl chloride resin composition of the present invention may optionally contain other additives, which are compounded in conventional chlorinated vinyl chloride resin compositions, in addition to the above additives. Examples of the other additives are fillers (e.g. titanium dioxide, calcium carbonate, etc.), colorants, and the like.

The chlorinated vinyl chloride resin composition of the present invention may be prepared by compounding and kneading the above essential and optional components with any conventional mixing and kneading apparatuses.

The chlorinated vinyl chloride resin composition of the present invention is used particularly to produce extruded pipes, although it may be used to produce other shaped products which are produced from conventional chlorinated vinyl chloride resins.

EXAMPLES

The present invention will be explained in more detail by the following examples, which do not limit the scope of the invention in any way.

In the examples, "parts" and "%" are "wt. parts" and "wt. %", respectively, unless otherwise indicated.

Example 1

A vinyl chloride resin having a polymerization degree of 1,000 was post-chlorinated to obtain a chlorinated vinyl chloride resin having a chlorination degree of 67%.

MBS having a butadiene content of 46%, a styrene content of 34%, a Vicat softening point of 70° C. under a load of 1 kg, and an average dispersed particle size of 1500 Å (8 parts), and a chlorinated polyethylene having a chlorination degree of 35% (Trade name "H135" manufactured by DAISO CO., LTD.) (3 parts) were added to the above chlorinated vinyl chloride resin (100 parts). Furthermore, mercaptooctyltin (3parts) as a stabilizer, two polyethylene waxes (Trade names "AC-617A" and "AC-629A" manufactured by Allied Signal) (each 1 part) as lubricants, titanium dioxide (5 parts) as a filler, and a colorant were added. Then, the mixture was blended with a 300 liter super mixer during which the temperature rose to 130° C., and a homogeneous composition was obtained.

The composition was extruded with a TEC conical extruder (manufactured by Toshiba) in the form of a pipe having a diameter of 1 inch. In the extrusion, a resin temperature at the die tip was 192.5° C., a motor load was 76 amperes, a die pressure was 290 kg/cm$^2$, and a discharge amount was 63 kg/hr.

The Charpy impact strength of this pipe was measured at 23° C. and 0° C. according to JIS K-7111. The impact strength was 34 kg·cm/cm$^2$ at 23° C., and 23 kg·cm/cm$^2$ at 0° C.

The pipe was subjected to a drop-weight impact test at 0° C. according to ASTM D-2444. The drop-weight impact strength of the pipe was 14.1 kg·m.

A Vicat softening point was measured under a load of 1 kg or 5 kg according to JIS K-7206. The softening point was 127.4° C. and 112.5° C., respectively.

The pipe was subjected to a tensile test at 23° C. according to JIS K-7113. The tensile strength at break was 559 kg/cm$^2$, and the elongation at break was 125%.

The color tone of the pipe had no redness (AA) by the visual inspection. Thus, the pipe was regarded as having good thermal stability.

Example 2

A chlorinated vinyl chloride resin composition was prepared and extruded in the form of a pipe in the same manner as in Example 1 except that MBS having a butadiene content of 53.5%, a styrene content of 31.5%, a Vicat softening point of 55° C. under a load of 1 kg, and an average dispersed particle size of 1500 Å was used. In the extrusion, a resin temperature at the die tip was 195.9° C., a motor load was 76 amperes, a die pressure was 300 kg/cm$^2$, and a discharge amount was 59 kg/hr.

The Charpy impact strength of this pipe was measured at 23° C. and 0° C. according to JIS K-7111. The impact strength was 32 kg·cm/cm$^2$ at 23° C., and 22 kg·cm/cm$^2$ at 0° C.

The pipe was subjected to a drop-weight impact test at 0° C. according to ASTM D-2444. The drop-weight impact strength of the pipe was 11.4 kg·m.

A Vicat softening point was measured under a load of 1 kg or 5 kg according to JIS K-7206. The softening point was 127.2° C. and 112.3° C., respectively.

The pipe was subjected to a tensile test at 23° C. according to JIS K-7113. The tensile strength at break was 560 kg/cm$^2$, and the elongation at break was 124%.

The color tone of the pipe had no redness (A) by the visual inspection. Thus, the pipe was regarded as having good thermal stability.

Example 3

A chlorinated vinyl chloride resin composition was prepared and extruded in the form of a pipe in the same manner as in Example 1 except that the amount of MBS was changed to 12 parts, the amount of the chlorinated polyethylene was changed to 4 parts, and the amount of AC-617A (a lubricant) was changed to 1.3 parts. In the extrusion, a resin temperature at the die tip was 193.7°C., a motor load was 76 amperes, a die pressure was 280 kg/cm$^2$, and a discharge amount was 63 kg/hr.

The Charpy impact strength of this pipe was measured at 23° C. and 0° C. according to JIS K-7111. The impact strength was 32 kg·cm/cm$^2$ at 23° C., and 22 kg·cm/cm$^2$ at 0° C.

The pipe was subjected to a drop-weight impact test at 0° C. according to ASTM D-2444. The drop-weight impact strength of the pipe was 12.2 kg·m.

A Vicat softening point was measured under a load of 1 kg or 5 kg according to JIS K-7206. The softening point was 126.9° C. and 112.0°C., respectively.

The pipe was subjected to a tensile test at 23° C. according to JIS K-7113. The tensile strength at break was 551 kg/cm$^2$, and the elongation at break was 119%.

The color tone of the pipe had no redness (AA) by the visual inspection. Thus, the pipe was regarded as having good thermal stability.

Comparative Example 1

A chlorinated vinyl chloride resin composition was prepared and extruded in the form of a pipe in the same manner as in Example 1 except that MBS having a butadiene content of 70%, a styrene content of 7.5%, a Vicat softening point of 76° C. under a load of 1 kg, and an average dispersed particle size of 2300 Å was used in an amount of 6 parts. In the extrusion, a resin temperature at the die tip was 197.1° C., a motor load was 76 amperes, a die pressure was 320 kg/cm$^2$, and a discharge amount was 56 kg/hr.

The Charpy impact strength of this pipe was measured at 23° C. and 0° C., according to JIS K-7111. The impact strength was 31 kg·cm/cm$^2$ at 23° C., and 21 kg·cm/cm$^2$ at 0° C.

The pipe was subjected to a drop-weight impact test at 0° C. according to ASTM D-2444. The drop-weight impact strength of the pipe was 9.5 kg·m.

A Vicat softening point was measured under a load of 1 kg or 5 kg according to JIS K-7206. The softening point was 127.4° C. and 113.4° C., respectively.

The pipe was subjected to a tensile test at 23° C. according to JIS K-7113. The tensile strength at break was 560 kg/cm$^2$, and the elongation at break was 125%.

The color tone of the pipe had no redness (A) by the visual inspection. Thus, the pipe was regarded as having good thermal stability.

Comparative Example 2

A chlorinated vinyl chloride resin composition was prepared and extruded in the form of a pipe in the same manner as in Example 1 except that MBS having a butadiene content of 70%, a styrene content of 4.5%, a Vicat softening point of 50° C. under a load of 1 kg, and an average dispersed particle size of 2100 Å was used in an amount of 6 parts. In the extrusion, a resin temperature at the die tip was 196.6° C., a motor load was 76 amperes, a die pressure was 310 kg/cm$^2$, and a discharge amount was 56 kg/hr.

The Charpy impact strength of this pipe was measured at 23° C. and 0° C. according to JIS K-7111. The impact strength was 32 kg·cm/cm$^2$ at 23° C., and 22 kg·cm/cm$^2$ at 0° C.

The pipe was subjected to a drop-weight impact test at 0° C. according to ASTM D-2444. The drop-weight impact strength of the pipe was 11.8 kg·m.

A Vicat softening point was measured under a load of 1 kg or 5 kg according to JIS K-7206. The softening point was 127.6° C. and 113.5° C., respectively.

The pipe was subjected to a tensile test at 23° C. according to JIS K-7113. The tensile strength at break was 563 kg/cm$^2$, and the elongation at break was 121%.

The color tone of the pipe had no redness (A) by the visual inspection. Thus, the pipe was regarded as having good thermal stability.

Comparative Example 3

A chlorinated vinyl chloride resin composition was prepared and extruded in the form of a pipe in the same manner as in Example 1 except that the amount of MBS was changed to 8 parts, and no chlorinated polyethylene was used. In the extrusion, a resin temperature at the die tip was 200.4° C., a motor load was 76 amperes, a die pressure was 310 kg/cm$^2$, and a discharge amount was 54 kg/hr.

The Charpy impact strength of this pipe was measured at 23° C. and 0° C. according to JIS K-7111. The impact strength was 30 kg·cm/cm$^2$ at 23° C., and 20 kg·cm/cm$^2$ at 0° C.

The pipe was subjected to a drop-weight impact test at 0° C. according to ASTM D-2444. The drop-weight impact strength of the pipe was 8.2 kg·m.

A Vicat softening point was measured under a load of 1 kg or 5 kg according to JIS K-7206. The softening point was 128.3° C. and 115.5° C., respectively.

The pipe was subjected to a tensile test at 23° C. according to JIS K-7113. The tensile strength at break was 579 kg/cm$^2$, and the elongation at break was 104%.

The color tone of the pipe had redness (B) by the visual inspection. Thus, the pipe was regarded as having poor thermal stability.

Comparative Example 4

A chlorinated vinyl chloride resin composition was prepared and extruded in the form of a pipe in the same manner as in Example 2 except that the amount of MBS was changed to 10 parts, and no chlorinated polyethylene was used. In the extrusion, a resin temperature at the die tip was 201.6° C., a motor load was 70 amperes, a die pressure was 320 kg/cm$^2$, and a discharge amount was 47 kg/hr. During the extrusion, burn streaks appeared on the pipe. Thus, the extrusion was stopped due to burning.

The Charpy impact strength of this pipe having the burn streaks was measured at 23° C. and 0° C. according to JIS K-7111. The impact strength was 27 kg·cm/cm² at 23° C., and 16 kg·cm/cm² at 0° C.

The pipe was subjected to a drop-weight impact test at 0° C. according to ASTM D-2444. The drop-weight impact strength of the pipe was 5.8 kg·m.

A Vicat softening point was measured under a load of 1 kg or 5 kg according to JIS K-7206. The softening point was 128.0° C. and 115.2° C., respectively.

The pipe was subjected to a tensile test at 23° C. according to JIS K-7113. The tensile strength at break was 580 kg/cm², and the elongation at break was 102%.

The pipe had burn streaks and its color tone had redness (C) by the visual inspection. Thus, the pipe was regarded as having very poor thermal stability.

The above results are summarized in Tables 1 and 2.

TABLE 1

| MBS[1] | Butadiene content (%) | Styrene content (%) | Vicat softening point under load of 1 kg (° C.) | Dispersed particle size (Å) |
|---|---|---|---|---|
| MBS(1) | 46 | 34 | 70 | 1500 |
| MBS(2) | 53.5 | 31.5 | 55 | 1500 |
| MBS(3) | 70 | 7.5 | 76 | 2300 |
| MBS(4) | 70 | 4.5 | 50 | 2100 |

Note:
[1]MBS(1): used in Examples 1 and 3 and Comparative Example 3.
MBS(2): used in Example 2 and Comparative Example 4.
MBS(3): used in Comparative Example 1
MBS(4): used in Comparative Example 2.

As can be seen from the results in Examples 1, 2 and 3, a chlorinated vinyl chloride resin composition comprising a vinyl chloride resin and also MBS particles having a butadiene content of less than 60 wt. % and a styrene content of larger than 30 wt. % in the whole particles can produce pipes by extrusion at a significantly increased discharge amount without deteriorating impact strength, heat resistance, tensile strength and heat stability of the produced pipes.

What is claimed is:

1. A chlorinated vinyl chloride resin composition for use in the production of an extruded pipe comprising
    100 wt. parts of a chlorinated vinyl chloride resin which has a polymerization degree of from 600 to 1500 prior to chlorination and a chlorination degree of from 62 to 70 wt. %,
    3 to 15 wt. parts of methyl methacrylate-butadiene-styrene copolymer particles having a butadiene content of less than 60 wt. % and a styrene content of larger than 30 wt. % in the whole particles, and
    1 to 5 wt. parts of a chlorinated polyethylene having a chlorine content of from 10 to 50 wt. %,
wherein said methyl methacrylate-butadiene-styrene copolymer particles have an average dispersed particle size of 2,000 angstroms or less in an extruded pipe produced from said composition.

2. A chlorinated vinyl chloride resin composition according to claim 1, wherein said methyl methacrylate-butadiene-styrene copolymer particles have a Vicat softening point of at least 60° C. under a load of 1 kg.

3. A chlorinated vinyl chloride resin composition according to claim 1, wherein said chlorinated polyethylene has a chlorine content of from 30 to 40 wt. %.

4. A chlorinated vinyl chloride resin composition according to claim 1, wherein the amount of said methyl methacrylate-butadiene-styrene copolymer particles is from 4 to 12 wt. parts per 100 wt. parts of said chlorinated vinyl chloride resin.

TABLE 2

|  | Ex. 1 | Ex. 2 | Ex. 3 | C. Ex. 1 | C. Ex. 2 | C. Ex. 3 | C. Ex. 4 |
|---|---|---|---|---|---|---|---|
| Chlorinated vinyl resin (parts) | 100 | 100 | 100 | 100 | 100 | 100 | 100 |
| MBS(1) (parts) | 8 | — | 12 | — | — | 8 | — |
| MBS(2) (parts) | — | 8 | — | — | — | — | 10 |
| MBS(3) (parts) | — | — | — | 6 | — | — | — |
| MBS(4) (parts) | — | — | — | — | 6 | — | — |
| Chlorinated polyethylene (part) | 3 | 3 | 4 | 3 | 3 | — | — |
| Mercaptooctyltin (parts) | 2 | 2 | 2 | 2 | 2 | 2 | 2 |
| ACPE 629A (parts) | 1 | 1 | 1 | 1 | 1 | 1 | 1 |
| ACPE 617A (parts) | 1 | 1 | 1.3 | 1 | 1 | 1 | 1.3 |
| TiO₂ (parts) | 5 | 5 | 5 | 5 | 5 | 5 | 5 |
| Resin temp. (° C.) | 192.5 | 195.9 | 193.7 | 197.1 | 196.6 | 200.4 | 201.6 |
| Motor load (Amp.) | 76 | 76 | 76 | 76 | 76 | 76 | 70 |
| Die pressure (kg/cm²) | 290 | 300 | 280 | 320 | 310 | 310 | 320 |
| Discharge amount (kg/hr) | 63 | 59 | 63 | 56 | 56 | 54 | 47 |
| Charpy impact strength |  |  |  |  |  |  |  |
| at 23° C. (kg · cm/cm²) | 34 | 32 | 32 | 31 | 32 | 30 | 27 |
| at 0° C. (kg · cm/cm²) | 23 | 22 | 22 | 21 | 22 | 20 | 16 |
| Drop-weight impact strength (kg · m) | 14.1 | 11.4 | 12.2 | 9.54 | 11.8 | 8.2 | 5.8 |
| Vicat softening point (° C.) |  |  |  |  |  |  |  |
| under load of 1 kg | 127.4 | 127.2 | 126.9 | 127.4 | 127.6 | 128.3 | 128.0 |
| under load of 5 kg | 112.5 | 112.3 | 112.0 | 113.4 | 113.5 | 115.5 | 115.2 |
| Tensile strength (kg/cm²) | 559 | 560 | 551 | 560 | 563 | 579 | 580 |
| Elongation at break (%) | 125 | 124 | 119 | 125 | 121 | 104 | 102 |
| Color tone of pipe | AA | A | AA | A | A | B | C |

5. A chlorinated vinyl chloride resin composition according to claim 1 which further comprises 1.5 to 5 wt. parts of a stabilizer and 1.5 to 4 wt. parts of a lubricant, per 100 wt. parts of said chlorinated vinyl chloride resin.

6. A method for the production of a pipe of a chlorinated vinyl chloride resin comprising extruding a chlorinated vinyl chloride resin composition of claim 1 to form the pipe.

* * * * *